United States Patent Office 3,266,853
Patented August 16, 1966

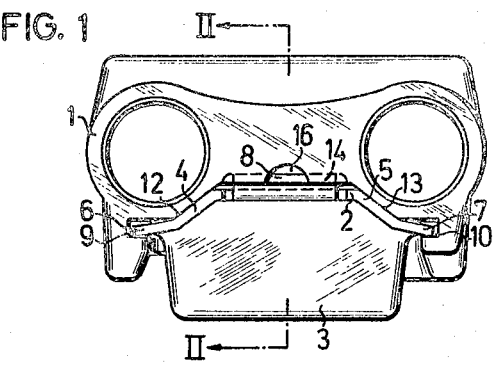
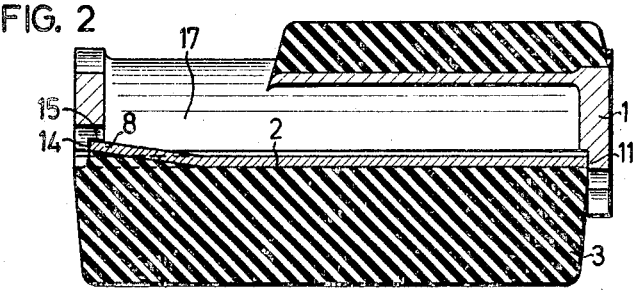
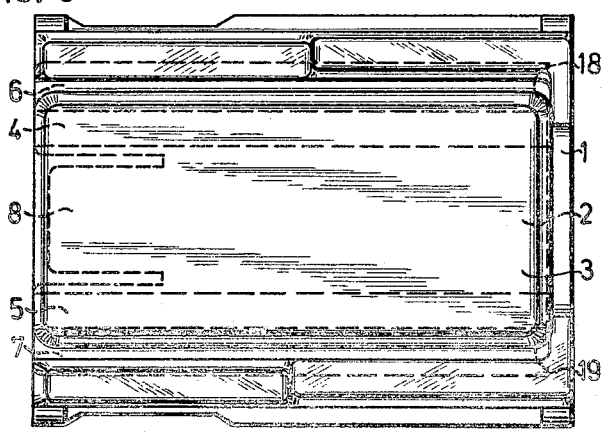

3,266,853
TRACK LINK UNITS
Otto Körner, Remscheid, and Siegfried Brentzek, Wipperfurth, Germany, assignors to Firma Diehl, Remscheid, Germany, a German Kommanditgesellschaft
Filed July 28, 1964, Ser. No. 385,580
Claims priority, application Germany, Aug. 24, 1963, D 42,318
6 Claims. (Cl. 305—36)

The invention relates to a track link unit for a tracked vehicle, said link having, at the ground side thereof, a plate-shaped sliding part fitted, for instance, with a pad, a steel projection, or a snow or mud rake. This sliding part can be attached to the track link without any bolts and can easily be disconnected.

Track links are known in which a sliding part fitted with a pad can be attached to the track link by means of a locking catch controlled by a coiled compression or tension spring. In this instance, however, there is no guarantee that the sliding part is attached securely to the track link, because the connection practically solely depends on the degree of compressive or tensile force exerted by the coiled spring. In view of the fact that the locking catches protrude opposite the top of the track link, there is a risk that the sliding parts become disconnected due to lateral forces to which the locking catches are subjected, particularly when moving over difficult ground. There is also a possibility that loosely arranged coil springs are lost before the sliding parts are fitted, and the latter, therefore, cannot be used. In another existing track link version the sliding part fitted with a pad is locked with a box-shaped track link by means of a locking device situated in one end of the pad which, when the pad is pressed or pushed in, engages in openings on the side of the box-shaped track link. Such a locking device, however, is only practicable in the case of sliding parts fitted with pads, because these serve as springs for the locking device. Furthermore, the actual locking as well as unlocking of the sliding part is made so difficult in view of the required deformation of the pad that it is questionable whether the sliding parts can be exchanged quickly.

The object of the invention is to eliminate the above mentioned drawbacks.

According to the invention, a track link for a tracked vehicle is provided, at the ground side thereof, with a plate-shaped sliding part fitted, for example, with a pad, a steel projection, or a snow or mud rake, said sliding part being lockable with the track link, and the construction is characterised in that the sliding part is inserted into grooves, situated at opposite sides of the track link, until arrested by a stop and is locked against withdrawal, in the opposite direction to that in which it has been inserted, by co-operation between an abutment of the link, and a spring catch, said catch being accessible from the outside when in its locking position.

The invention makes it possible to attach the sliding part to the track link in a simple and speedy manner, because it need only be inserted into the grooves of the track link by means of a lateral pressure or push until it comes to rest against the stop. When it has passed the abutment on the track link, the spring catch comes to rest behind the abutment, and the sliding part is thus secured against movement in both directions parallel to the grooves. The unlocking of the sliding part is equally simple. All that has to be done is to press the spring catch, which is arranged to be accessible from the outside, clear of the abutment. The sliding part can then be taken out of the track link grooves.

In a preferred version of the invention the sliding part is resilient and has a central portion from opposite sides of which diverge outwardly-directed inclined portions which continue into side flanges by means of which the sliding part rests in the grooves at opposite sides of the link, said link having inclined faces which correspond to the said inclined portions of the sliding part.

When a load is applied to a pad on the sliding part, in this preferred version of the invention, the locking of the sliding part with the track link is improved inasmuch as the inclined portions of the sliding part are pressed against the inclined faces of the track link. The flanges resting in the grooves of the track link thereby occupy a sloping position and are secured in the grooves. Furthermore, the flanges of the sliding part are preferably given a certain amount of initial stress so that the sliding part is also properly secured in the track link grooves and free from vibration when no load is applied.

The accompanying drawing shows an example of the invention.

FIGURE 1 of said drawing represents a side view of a track link of a vehicle together with a sliding part fitted with a pad.

FIGURE 2 represents a section on the line II—II of FIGURE 1.

FIGURE 3 represents a bottom view of the link shown in FIGURE 1.

Referring to the drawing, part 1 is the track link and part 2 the sliding part, the latter being made from a resilient material and being fitted with a pad 3. The sliding part 2 has two marginal portions 4 and 5 inclined outwards from a central portion of the part 2, and these portions 4, 5 continue in to two prestressed flanges 6 and 7. The central portion of the sliding part 2 has a segment forming a spring catch 8 which is slightly curved towards the track link 1. The latter has two grooves 9 and 10 at opposite sides, into which the sliding part 2 is inserted by means of its flanges 6 and 7, starting from one end of track link 1 until it comes to rest against a stop 11. Furthermore, track link 1 has two inclined surfaces 12 and 13 which correspond to the portions 4 and 5 of the sliding part 2, and on which sliding part 2 seats when a load is applied to pad 3. A recess 15 forms an abutment shoulder 14 at the ground side of track link 1, said shoulder cooperating with the free end of the spring catch 8 on part 2. A recess 16, which is accessible from one edge of the track link 1, is situated at the ground side of the track link 1, above shoulder 14, and this recess opens out into a recess 17. This recess 16 is used for inserting a tool by means of which the spring catch 8 is deflected in order to unlock the sliding part 2 so that the latter can be pushed out of the grooves 9 and 10 of track link 1. If, for instance, soil has accumulated in recess 16, the soil can be pushed into the recess 17 when inserting the tool used for unlocking the sliding part 2. With a view to obviating the need for cleaning the grooves 9 and 10 of the track link 1 prior to inserting the sliding part 2, the extremities of the flanges 6 and 7 of the sliding part 2 are fitted with cleaning projections 18 and 19 by means of which dirt which has accumulated in grooves 9 and 10 can be removed.

We claim:

1. A track link unit comprising: a track link having grooves at opposite sides thereof and having a stop and an abutment shoulder; and a plate-shaped resilient sliding part fitted with a ground-engaging part, said sliding part having a resilient segment integral therewith and forming a spring catch, said sliding part having a central portion from opposite sides of which diverge outwardly-directed inclined portions which continue into side flanges by means of which the sliding part rests in the aforesaid grooves of the track link, said link having inclined faces the angle of inclination of which corresponds to that of said inclined portions of the sliding part, whereby when under load said inclined portions press on said inclined faces and cause said side flanges to occupy sloping positions in the grooves; said plate-shaped sliding part being arranged in said grooves of said link and in abutment with said stop while being locked against withdrawal from said track link by cooperation between the aforesaid abutment shoulder of the link and the aforesaid spring catch, said link being at that side thereof which faces said ground engaging member provided with a recess accessible from the outside for receiving a tool therein to press said spring catch out of its locking engagement with said abutment shoulder.

2. A track link unit comprising: a track link having grooves at opposite sides thereof and also being provided with stop means: a ground engaging member including a plate-shaped sliding part arranged in said grooves of said link and in abutment with said stop means, said plate-shaped sliding part and said track link being provided with interlocking means interlocking said ground engaging member and said track link, said interlocking means being accessible from the outside to make said interlocking means ineffective to thereby permit disengagement of said ground engaging member and said track link from each other, said interlocking means including a spring catch integral with said plate-shaped sliding part and forming a resilient tongue-shaped segment thereof slightly bent toward said track link, said interlocking means also comprising means forming part of said track link for lockingly receiving said spring catch.

3. A track link unit according to claim 2, in which said spring catch receiving means is formed by a recess facing said ground engaging member.

4. A track link unit according to claim 3, in which said recess has an enlargement for receiving a tool to press said spring catch out of said recess.

5. A track link unit comprising: a track link having grooves at opposite sides thereof and also being provided with stop means; a ground engaging member including a plate-shaped sliding part in abutment with said stop means; said grooves having first surface means facing said track link and also having second surface means facing said ground engaging member; said sliding part having a central portion from opposite sides of which diverge outwardly directed inclined portions extending in a direction away from said track link, said sliding part also having lateral flange portions integral with said inclined portions and received in said grooves; said track link having inclined faces the angle of inclination of which corresponds to that of said inclined portions of said sliding part whereby when under load said inclined portions press against said inclined faces and cause said lateral flange portions to engage said first surface means under pressure, said plate-shaped sliding part and said track link being provided with interlocking means interlocking said ground engaging member and said track link, said interlocking means being accessible from the outside to make said interlocking means ineffective to thereby permit disengagement of said ground engaging member and said track link from each other, said interlocking means including a spring catch integral with said plate-shaped sliding part and forming a resilient tongue-shaped segment thereof slightly bent toward said track link, said interlocking means also comprising means forming part of said track link for lockingly receiving said spring catch.

6. A track link unit according to claim 5, in which said lateral flange portions are arranged at an angle with regard to said inclined portions and engage said first surface means of said grooves under pre-tension.

References Cited by the Examiner
UNITED STATES PATENTS

| | | | |
|---|---|---|---|
| 1,041,450 | 10/1912 | Drew | 305—55 X |
| 2,686,697 | 8/1954 | Baker | 305—55 X |
| 2,917,347 | 12/1959 | Reuter | 305—38 |
| 3,071,417 | 1/1963 | Militana | 305—54 |

BENJAMIN HERSH, *Primary Examiner.*

R. J. JOHNSON, *Assistant Examiner.*